United States Patent [19]

Mori et al.

[11] Patent Number: 4,959,274

[45] Date of Patent: Sep. 25, 1990

[54] MULTILAYERED IRON-COPPER-LEAD ALLOY BEARING MATERIAL

[75] Inventors: Sanae Mori; Masaaki Sakamoto, both of Nagoya; Koichi Yamamoto, Komaki; Kenji Sakai, Ichinomiya, all of Japan

[73] Assignee: Daido Metal Company, Ltd., Nagoya, Japan

[21] Appl. No.: 396,393

[22] Filed: Aug. 21, 1989

[30] Foreign Application Priority Data

Sep. 14, 1988 [JP] Japan .................. 63-230858

[51] Int. Cl.⁵ .............................. B22F 7/04
[52] U.S. Cl. .................... 428/555; 428/334; 428/676; 428/682; 428/681
[58] Field of Search ............ 428/555, 676, 682, 681, 428/334

[56] References Cited

U.S. PATENT DOCUMENTS

| | | |
|---|---|---|
| 4,121,928 | 10/1978 | Mori ............................ 75/208 |
| 4,189,522 | 2/1980 | Mori ............................ 428/557 |
| 4,438,004 | 3/1984 | Myers .......................... 252/12 |
| 4,456,578 | 6/1984 | Ward ........................... 419/8 |
| 4,576,872 | 3/1986 | Ward ........................... 428/550 |

FOREIGN PATENT DOCUMENTS

| | | |
|---|---|---|
| 40-5485 | 3/1965 | Japan . |
| 61-6202 | 1/1986 | Japan . |
| 61-69902 | 4/1986 | Japan . |
| 726127 | 3/1955 | United Kingdom . |

Primary Examiner—Stephen J. Lechert, Jr.
Assistant Examiner—Leon Nigohosian, Jr.
Attorney, Agent, or Firm—Browdy and Neimark

[57] ABSTRACT

A multilayered iron-copper-lead alloy bearing material in the form of a bimetal, comprising a steel backing plate, an iron-copper-lead type sintered alloy layer whose major components is iron, a copper plating layer of a thickness of 2 to 20 μm disposed between the steel backing plate and the iron-copper-lead type sintered alloy layer.

4 Claims, 2 Drawing Sheets

TEST UNDER STATIC LOAD

MULTILAYERED IRON-COPPER-LEAD ALLOY BEARING MATERIAL

Background of the Invention

The present invention relates to an improvement in an iron-copper-lead alloy sliding material suitably used in sliding portions such as sliding bearings.

Hitherto, the major portion of conventional iron-copper base alloy materials for bearing comprise a solid type bearing material without any backing plate and obtained by compacting the alloy powder and then sintering it. In recent years, a bimetal shaped bearing material has been developed which is formed by directly distributing iron-copper base alloy powder on the surface of a steel plate and by repeating sintering and rolling.

However, the conventional iron-copper base alloy bearing materials suffer from too poor strength to meet the demand of sufficient load durability due to the solid type structure of the material. Therefore, a method for improving the load durability has been developed by providing a bimetal structure comprising a steel backing plate and a sintered alloy of iron, copper and lead. However, a material obtained by directly distributing powder of an alloy of iron, copper and lead on the surface of the steel backing plate cannot display sufficient adhesive force at the sintering temperature of 700° to 900° C. In particular, the more the contents of lead increase, the more the adhesive force becomes deteriorated. If the sintering temperature is raised to 1000° to 1150° C., the adhesive force between the steel backing plate and the sintered alloy can be improved. However, included lead becomes coarse and enlarged, causing the lubricating performance to deteriorate.

Summary of the Invention

An object of the present invention is to provide a multilayered iron-copper-lead alloy bearing material having a multilayered structure, exhibiting an excellent load durability, containing a relatively large proportion of le-ad-for improving a seizure resisting property, and displaying a satisfactory adhesive force between the steel backing plate and sintered alloy even if the sintering temperature is 700° to 900° C.

In order to achieve the object, a multilayered iron-copper-lead alloy bearing material of the invention in the form of a bimetal, comprises a steel backing plate, and an iron-copper-lead type sintered alloy layer whose main component is iron (Fe), and a copper (Cu) plating layer of a thickness of 2 to 20 μm disposed between the steel backing plate and the iron-copper-lead type sintered alloy layer.

The composition of the Fe-Cu-Pb type sintered alloy layer consists of: 10 to 40 wt. % copper (Cu): 1 to 7 wt. % tin (Sn): 10 to 40 wt. % lead (Pb): 0.5 wt. % or less of phosphorus (P): an optionally added first element of 0.5 to 4.0 wt. % graphite: and an optionally added second element of at least one kind selected from the group consisting of zinc (Zn), nickel (Ni) and boron (B) by 5 wt. % or less; and the balance Fe and incidental impurities. In addition, a Cu-plating layer of 2-20 μm is formed between the steel backing plate and the Fe-Cu-Pb-type sintered alloy. The Fe-Cu-Pb alloy powder is disposed on the steel backing plate onto which copper had been previously plated, and the sintering and etc. are effected to form a sintered alloy.

Then, the reasons for the restriction of the allowable contents regarding each constituent of the bearing material according to the present invention and the reason for the restriction of the thickness of the copper plating are explained below.

(a) The copper plating layer thickness: 2 to 20 μm

If the thickness of this layer is less than 2 μm, the adhesive force between the steel backing plate and the sintered alloy will be insufficient. If the same exceeded 20 μm, a layer having insufficient strength becomes too thick, causing the overall strength of the material to deteriorate, and the manufacturing cost to be increased. It is preferable that this thickness is 5 to 10 μm.

(b) Content of copper (Cu): 10 to 40 wt. %

If copper is less than 10 wt. %, sintering cannot be sufficiently performed, and the required toughness cannot be obtained and adhesive force also deteriorates. If the same exceeded 40 wt. %, the strength of the alloy deteriorates, and the material cost is raised. It is preferable that the content of Cu is in the range of 20 to 35 wt. %.

(c) Content of tin (Sn): 1 to 7 wt. %

If the content of tin is less than 1 wt. %, sintering cannot be sufficiently performed and the strength of the copper phase deteriorates. If the same exceeded 7 wt. %, the copper phase becomes brittle, and the material cost is raised. It is preferable that the content of tin is in the range of 2 to 5 wt. %.

(d) Content of phosphorus: 0.5 wt. % or less

If the content of phosphorus exceeded 0.5 wt. %, the copper phase becomes brittle. It is preferable that the content of phosphorus is in the range of not more than 0.5 wt. % and is preferably not more than 0.2 wt. %.

(e) Content of lead (Pb): 10 to 40 wt. %

If the content of lead is less than 10 wt. %, the lubricating performance and sintering characteristics become insufficient. If the same exceeded 40 wt. %, the adhesive force between the steel backing plate and the alloy and the overall strength of the alloy deteriorate excessively.

(f) Content of graphite (Gr): 0.5 to 4 wt. %.

If the content of graphite is less than 0.5 wt. %, the lubricating performance in a boundary lubricating state becomes insufficient. If the same exceeds 4 wt. %, the strength of the alloy deteriorates excessively.

(g) Content of at least one component selected from the group consisting of zinc (Zn), nickel (Ni) and boron (B): 5 wt. % or less The components are contained with the intention of further strengthening the copper phase in the matrix. If it exceeded 5 wt. %, the copper phase becomes brittle.

Preferred Embodiments of the Invention

Figure 1:
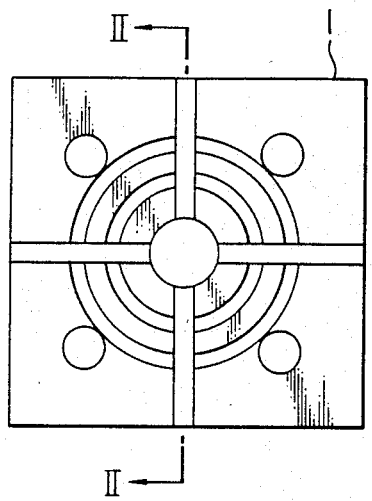
FIG. 1 is a front elevational view which illustrates a test sample used in the seizuring test.

Then, embodiments of the present invention will be described.

A multilayered iron-copper-lead alloy bearing material in the form of a bimetal shape having the overall thickness of 1.6 mm and the thickness of alloy of 0.4 mm was prepared and samples 1 to 8 were obtained therefrom. The material was produced by a process having the steps of: disposing −100 mesh powder having the compositions as shown in Table 1 to form a layer of a thickness of 0.5 to 1.5 mm on the surface of a mild steel plate (1.5 mm in thickness and 100 mm in width) having an electrolyte plating layer of 2 to 20 μm, preferably 5 to 10 μm; effecting the sintering thereof at 700° to 900° C. for 10 to 30 minutes in a reducing furnace in which there existed a hydrogen-nitrogen gas stream, and rolling the thus-obtained sintered and combined material at a rolling reduction of 3 to 20%. The thickness of the copper plating layers of each of the samples 1 to 8 was about 8 μm. In the process, the sintering and rolling may be repeated by a required number of times if necessary.

Furthermore, in order to confirm the superiority of the bearing materials according to the present invention, there were prepared such comparison samples 9 to 12 of the bearing materials were as shown in Table 1 which comparison samples were obtained by disposing an alloy layer having components, which were out of the contents according to the present invention, on the copper plating layer provided on a steel plate of about 8 μm under the same conditions as those for the above-described samples 1 to 8. Furthermore, there were prepared other comparison examples each having such alloy layer as shown in Table 1, having the components of contents which were out of the range according to the present invention, which alloy layer were disposed on the steel plate on which there was no copper plating layer, to thereby manufacture bearing materials by use of the same conditions as those for the above-described examples 1 to 8, so that comparison samples 13 and 14 were obtained.

TABLE 1

| Type | Sample No. | Fe | Cu | Sn | P | Pb | Gr | Zn | Ni | B | Whether or not Cu plating layer is present (the thickness thereof) |
|---|---|---|---|---|---|---|---|---|---|---|---|
| Present Invention | 1 | Bal | 28 | 3.5 | 0.02 | 25 | — | | | | Present (8 μm) |
| | 2 | " | 28 | 3.5 | 0.02 | 15 | 1 | | | | |
| | 3 | " | 28 | 3.5 | 0.02 | 25 | — | 1.0 | | | |
| | 4 | " | 28 | 3.5 | 0.02 | 25 | — | | 2.0 | | |
| | 5 | " | " | " | " | 25 | — | | | 1.0 | |
| | 6 | " | " | " | " | 15 | 1 | 1.0 | | | |
| | 7 | " | " | " | " | 15 | 1 | — | 2.0 | | |
| | 8 | " | " | " | " | 15 | 1 | | | 1.0 | |
| Comparative Example | 9 | " | " | " | " | 5 | — | | | | Present (8 μm) |
| | 10 | " | " | " | " | 5 | 1 | | | | |
| | 11 | " | 48 | 6 | 0.03 | 25 | — | | | | |
| | 12 | " | 8 | 1 | 0.01 | 25 | — | | | | |
| | 13 | " | 28 | 3.5 | 0.02 | 25 | — | | | | Not Present |
| | 14 | " | 28 | 3.5 | 0.02 | 15 | 1 | | | | |

By using the thus-obtained samples 1 to 14, the mechanical strength of the bearing materials, that is, the tensile strength, the adhesive force between the steel backing plate and the sintered alloy layer, and the hardness of the alloy were examined. The results are shown in Table 2. In these tests, the results of the adhesion strength test between the steel backing plate and the sintered alloy layer shown were obtained by the following steps: a bearing alloy plate (a bimetal flat plate) with a backing plate and having a width of B (mm) was first obtained regarding each of the samples, two parallel grooves being then formed on one exterior surface of the bearing alloy and on another opposite surface thereof, these grooves reaching the boundary interface defined by an adhesive, and both ends of the test samples being pulled to obtain adhesion strength by dividing the tensile load (Kg) by an adhered area B×L (mm²), where L represents the distance (mm) between the two grooves.

TABLE 2

| Type | Sample No. | Tensile Strength (kg/mm²) | Force adhering steel back plate and alloy layer (kg/mm²) | Hardness of alloy layer (Hv) | Shape of Product | Whether or not Cu plating layer is present (the thickness thereof) |
|---|---|---|---|---|---|---|
| Present Invention | 1 | 21 | 16 | 102 | Flat bimetal | Present (8 μm) |
| | 2 | 19 | 15 | 98 | Flat bimetal | |
| | 3 | 23 | 17 | 105 | Flat bimetal | |
| | 4 | 25 | 19 | 110 | Flat bimetal | |
| | 5 | 22 | 16 | 101 | Flat bimetal | |
| | 6 | 20 | 15 | 98 | Flat bimetal | |
| | 7 | 22 | 18 | 106 | Flat bimetal | |
| | 8 | 20 | 18 | 100 | Flat bimetal | |
| Comparative Example | 9 | 31 | 21 | 123 | Flat bimetal | Present (8 μm) |
| | 10 | 28 | 19 | 118 | Flat bimetal | |
| | 11 | 22 | 20 | 95 | Flat bimetal | |
| | 12 | 21 | 9 | 106 | Flat bimetal | |
| | 13 | 20 | 6 | 101 | Flat bimetal | Not Present |
| | 14 | 17 | 5 | 97 | Flat bimetal | |

As is shown in Table 2, according to the present invention (samples 1 to 8), since the copper plating layer is disposed between the steel backing plate and the alloy layer, the adhesive force can be significantly improved in comparison with the comparative examples (samples 13 and 14). According to the sample 12 of the comparative example in which, although the copper plating layer was present, the content of copper was reduced to 8 wt. % which was lower than the lower limit of the present invention showed insufficient adhesive force. On the other hand, according to the sample 11 of the comparative example which contained copper of 48 wt. % which exceeded the upper limit of the present invention encountered deterioration in the alloy hardness, and the cost increased.

Figure 2:
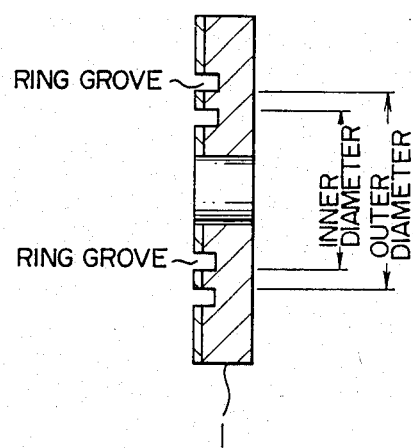
FIG. 2 is a cross-sectional view taken along lie II—II of FIG. 1.
Figure 3:
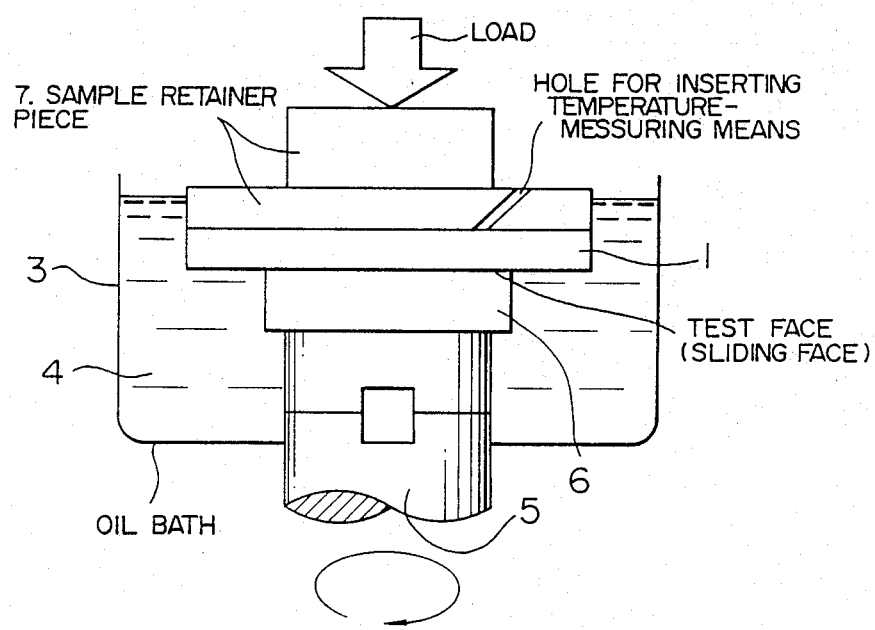
FIG. 3 is a cross-sectional view which illustrates an essential portion of a seizuring test apparatus.
Figure 4:
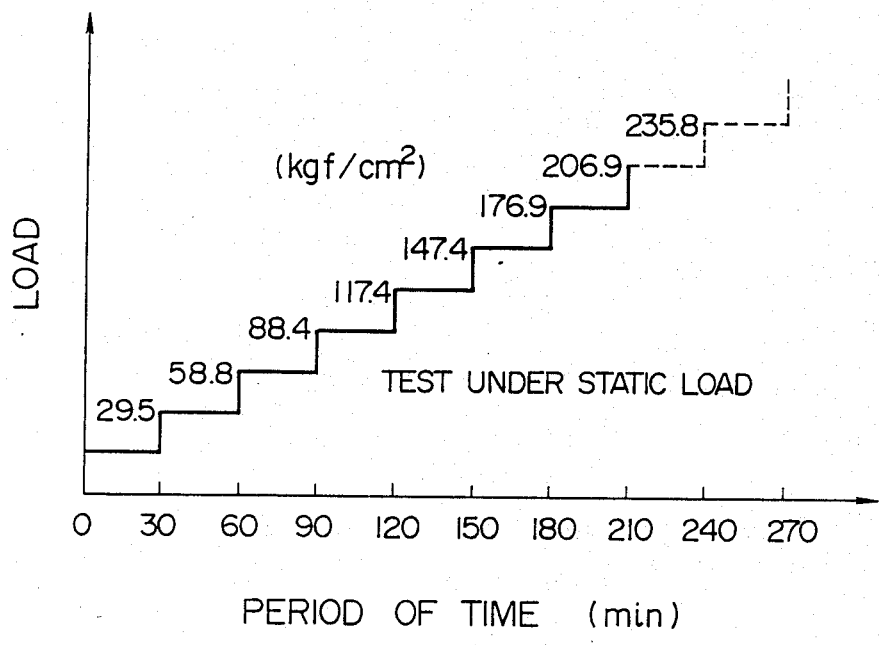
FIG. 4 is a graph which illustrates an accumulative loading state in the seizuring test.

In addition, seizuring tests were effected regarding the above-described samples 1 to 14 for the purpose of examining the characteristics of the bearings. The results are shown in Table 3. In order to perform these seizuring tests, a test piece 1 as shown in FIGS. 1 and 2 was prepared from each of the sample 1 to 14. The thus-obtained test-piece 1 was subjected to the test by using a testing apparatus 2 as shown in FIG. 3. This testing apparatus 2 comprised a lubricant tank 3 filled with a lubricant (oil) 4, in which lubricant tank 3 a rotational shaft 5 was projected from the bottom surface thereof and was provided at the upper part thereof a member 6 which is adapted to be in pressure contact with the test piece 1 during the seizure test. A sample retainer 7 to which a load was applied from the above was disposed in the upper portion of the lubricant tank 3. The seizure resistance was examined on the sliding surface defined between the test piece 1 and the corresponding member 6 by rotating the rotational shaft 5 while the test piece 1 is made to be in pressure contact with the corresponding member 6. The retainer 7 was provided with a thermo-couple hole 8 for measuring the temperature of the test piece 1. By using the thus-structured testing apparatus 2, the seizuring test was performed in accordance with an accumulative loading method shown in FIG. 4 and under the best conditions shown in Table 4, where a load at which the temperature of the rear side of the bearing exceeded 200° C. was decided to be the maximum bearing pressure at which the seizure occurs.

As shown from Table 3, samples (samples 1 to 5) containing 25 wt. % lead and samples (samples 6 to 8) containing both 15 wt. % lead and 1 wt. % graphite showed significantly improved seizure resistance in comparison with the comparative examples (samples 9 and 10) containing lead of 5 wt. % which is below the lower limit defined in the present invention. Furthermore, the samples according to the present invention showed excellent seizure resistance in comparison with the comparative example (sample 12) containing both copper of 8 wt. % which is below the lower limit defined in the present invention and iron of a much amount. Although an excellent seizure resisting property was obtained in the comparative example 11 having copper content of 48 wt. % which exceeded the upper limit of the present invention, the hardness of the alloy layer thereof was deteriorated excessively.

TABLE 3

| Sample | Maximum Pressure when seizure occurs | Whether or not Cu plating layer is present (the thickness thereof) |
|---|---|---|
| The Present Invention | | |
| 1 | ~275 | Present (8 μm) |
| 2 | ~275 | |
| 3 | ~275 | |
| 4 | ~275 | |
| 5 | ~275 | |
| 6 | ~275 | |
| 7 | ~275 | |
| 8 | ~275 | |
| Comparative Examples | | |
| 9 | ~150 | Present (8 μm) |
| 10 | ~150 | |
| 11 | ~275 | |
| 12 | ~175 | |
| 13 | ~200 | Not Present |
| 14 | ~175 | |

As described above, according to the multi-layer iron-copper-lead alloy bearing material according to the present invention, the adhesive strength can be significantly improved by the presence of the copper plating layer between the steel backing plate and the sintered alloy. Furthermore, the reduction in the adhesive force due to the addition of lead can be minimized because of the copper plating layer and, since a relatively larger amount of lead can be contained, the seizure resistance can be also improved. In particular, in the invention there is provided a copper plating layer of 2 to 20 μm between the steel backing plate and the sintered alloy layer, with the result that the adhesive fore provided between the sintered alloy layer and steel can be improved and that a larger amount of lead can be contained (the reduction in adhesive strength can be minimized) in comparison with conventional bimetal type materials (for example, see Japanese Patent Unexamined Publication No. 52-68805). Consequently, significantly excellent bearing characteristics can be obtained in the bearings of the invention.

What is claimed is:

1. A multilayered iron-copper-lead alloy bearing material in the form of a bimetal, comprising
   a steel backing plate;
   a sintered iron-based alloy layer comprising 10 to 40 wt. % copper, 1 to 7 wt. % tin, 10 to 40 wt. % lead, 0.5 wt. % or less of phosphorus and the balance iron and incidental impurities;
   and a copper plating layer of a thickness of 2 to 20 μm disposed between said steel backing plate and said sintered iron-based alloy layer.

2. A multi-layered iron-copper-lead alloy bearing material according to claim 1, wherein said sintered iron based alloy layer further comprises 0.5 to 4 wt. % graphite.

3. A multilayered iron-copper-lead alloy bearing material according to claim 1, wherein said sintered iron based alloy layer further comprises at least one member, of not more than 5 wt. % in total, selected from the group consisting of zinc, nickel and boron.

4. A multilayered iron-copper-lead alloy bearing material according to claim 2, wherein said sintered iron based alloy layer further comprises at least one member, of not more than 5 wt. % in total, selected from the group consisting of zinc, nickel and boron.

* * * * *